United States Patent
Mikawa

(10) Patent No.: US 9,013,601 B2
(45) Date of Patent: Apr. 21, 2015

(54) INFORMATION DATA PROCESSING APPARATUS

(75) Inventor: Takuma Mikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1409 days.

(21) Appl. No.: 12/400,134

(22) Filed: Mar. 9, 2009

(65) Prior Publication Data

US 2009/0180762 A1  Jul. 16, 2009

Related U.S. Application Data

(62) Division of application No. 10/350,094, filed on Jan. 24, 2003, now Pat. No. 7,565,056.

(30) Foreign Application Priority Data

Feb. 1, 2002 (JP) ................................ 2002-025417

(51) Int. Cl.
| | | |
|---|---|---|
| H04N 5/76 | (2006.01) | |
| H04N 5/77 | (2006.01) | |
| H04N 5/765 | (2006.01) | |
| H04N 5/85 | (2006.01) | |
| H04N 9/804 | (2006.01) | |

(52) U.S. Cl.
CPC ............. *H04N 5/772* (2013.01); *H04N 5/765* (2013.01); *H04N 5/85* (2013.01); *H04N 9/8042* (2013.01)

(58) Field of Classification Search
USPC .......... 348/211.1, 211.13, 211.3, 231.99, 42, 348/47, 51, 221.1; 386/224; 706/50
See application file for complete search history.

(56) References Cited

U.S. PATENT DOCUMENTS

| | | | |
|---|---|---|---|
| RE36,801 E | 8/2000 | Logan et al. | 348/571 |
| 6,453,071 B2 | 9/2002 | Ito et al. | 382/232 |
| 6,480,667 B1 | 11/2002 | O'Connor | 386/83 |
| 6,529,236 B1 * | 3/2003 | Watanabe | 348/230.1 |
| 6,864,911 B1 * | 3/2005 | Zhang et al. | 348/42 |
| 6,954,280 B1 * | 10/2005 | Kaibara | 358/1.15 |
| 7,158,266 B2 * | 1/2007 | Kameyama | 358/403 |
| 7,499,078 B2 * | 3/2009 | Vu et al. | 348/207.1 |
| 2001/0006525 A1 * | 7/2001 | Mizuguchi et al. | 370/538 |
| 2002/0021359 A1 * | 2/2002 | Okamoto | 348/222 |
| 2005/0057668 A1 * | 3/2005 | Kokusho | 348/231.99 |
| 2006/0087568 A1 * | 4/2006 | Tanaka et al. | 348/231.99 |
| 2011/0191280 A1 * | 8/2011 | Takahashi | 706/50 |

FOREIGN PATENT DOCUMENTS

| | | |
|---|---|---|
| JP | 10-285564 | 10/1998 |
| JP | 2001-320532 | 11/2001 |

* cited by examiner

*Primary Examiner* — Thai Tran
*Assistant Examiner* — Mishawn Dunn
(74) *Attorney, Agent, or Firm* — Fitzpatrick, Cella, Harper & Scinto

(57) ABSTRACT

A signal processing apparatus of a configuration capable of requesting a transmission of an information file including the currently received information data in response to an instruction for starting a recording in the course of reception of information data transmitted from a transmitting apparatus and decoding of the information data by a decoder, and receiving the information file transmitted from the transmitting apparatus in response to the transmission request, while suspending the decoding process by the decoder.

35 Claims, 6 Drawing Sheets

FIG. 1
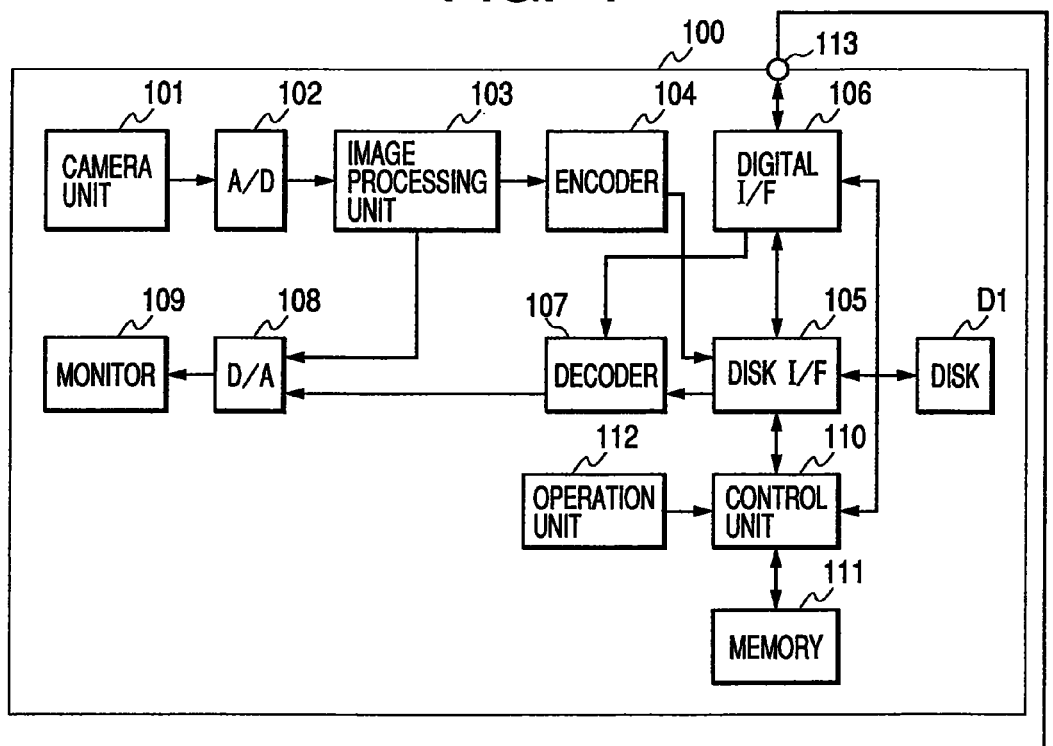
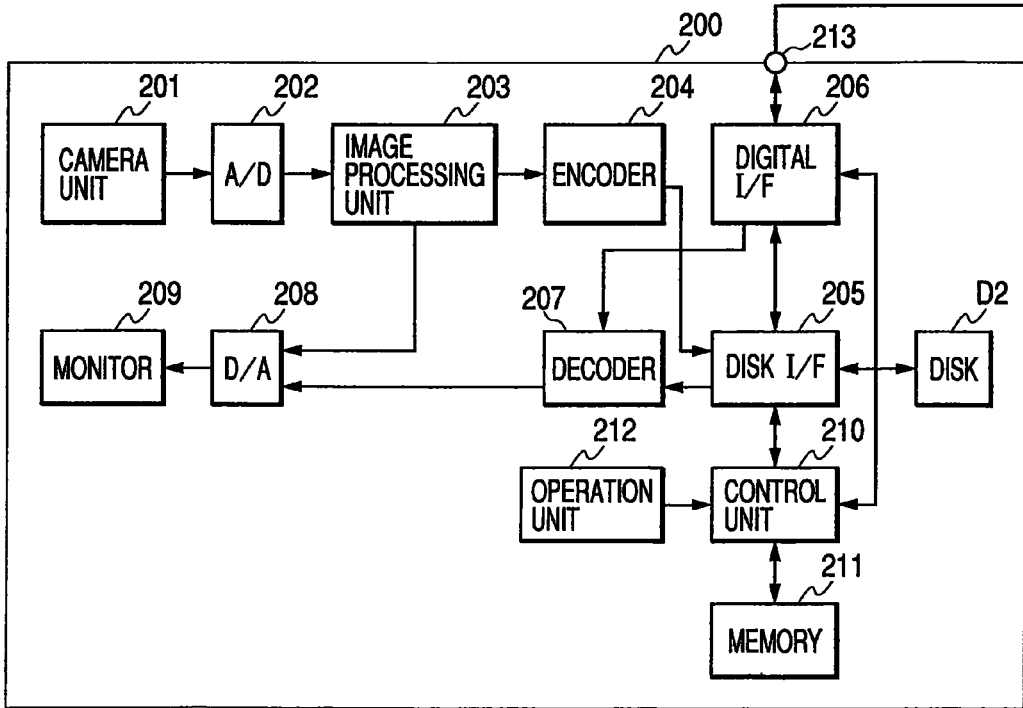

INFORMATION DATA PROCESSING APPARATUS

This is a divisional of U.S. patent application Ser. No. 10/350,094, filed Jan. 24, 2003, pending.

BACKGROUND OF THE INVENTION

1. Field of the Invention

The present invention relates to a data processing apparatus, and more particularly to a communication process for information data.

2. Related Background Art

Recently equipment for recording digital image data of a moving image or a still image, such as a digital camera or a digital video camera, is becoming popular.

In the digital camera, a compact memory card is widely employed as the recording medium, and there is also available the camera of a type capable of recording moving image data in addition to still image data.

In the digital video camera, a magnetic tape is widely employed as the recording medium. In addition, there is also available the camera of a type utilizing a recording medium capable of random access such as a compact memory card or a magnetooptical disk, thereby being capable of recording not only moving image data but also still image data. The digital video camera utilizing such random accessible recording medium is arranged to store the image data in a file format.

In such equipment, transferring image data through a cable connected to another equipment is commonly practiced, and in particular, a data transfer format called IEEE 1394 interface is widely utilized in the digital video camera.

The IEEE 1394 interface is featured by including, as the transfer modes, an asynchronous transfer mode (non-synchronized transfer mode) for transferring non-synchronized data, and an isochronous transfer mode (synchronized transfer mode) for transferring synchronized data such as real-time video stream data.

The isochronous transfer mode is effective for transferring data a predetermined data amount of which is required to be transferred continuously at a constant transfer rate, such as moving image stream data. For example, in case of connecting a digital video camera and a personal computer (PC) through an IEEE 1394 interface, it is made possible, by utilizing the isochronous transfer mode, to cause the PC to decode the image data transferred from the digital video camera to the PC and to display such image data on real-time basis on a monitor of the PC.

On the other hand, the asynchronous transfer mode is effective for transferring data that is required to be transferred to a designated node in non-synchronous manner, for example a control command or file data. Also in the asynchronous transfer mode, there can be made a response indicating that a receiving operation has been executed, so that the communication can be executed more securely than in the isochronous transfer mode. In case of transmitting or receiving the image data by the digital video camera on real-time basis utilizing the IEEE 1394 interface, it is common to utilize the isochronous transfer mode. Also the asynchronous transfer mode is incapable of ensuring transfer of moving image data or the like at a predetermined timing, and is therefore unsuitable for the transfer of data which may be required to be decoded and monitored in the course of reception thereof, such as moving image stream data.

For example, there is widely available an application software which, in case of connecting a digital video camera and a PC through an IEEE 1394 interface, attains that the PC decodes the image data transmitted from the digital video camera to the PC by the isochronous transfer mode, to be displayed in real-time. There is also available an application software which attains to store the image data transmitted to the PC in the isochronous transfer mode, in a hard disk of the PC in response to a user instruction thereby preparing a moving image data file.

It is also commonly executed to connect two digital video cameras with an IEEE 1394 interface to execute a dubbing of the image data utilizing the isochronous transfer mode.

However, in case of recording an image data stream transferred in the real-time transfer mode, onto a recording medium, there remains a possibility, as a problem, that the image data stored in the recording medium of the equipment at the transmitting side do not completely coincide with the image data recorded in the equipment of the image receiving side.

For example, in case of connecting a digital video camera which handles the image data on the recording medium as an image data file, with a PC through an IEEE 1394 and storing as a file in the PC the image data transferred from the video camera in the isochronous mode, the PC initiates the recording of the image data from a position where the start of recording is instructed, so that the moving image data may not completely coincide in a start portion or an end portion of such moving image data between recording medium and the PC.

As a result, the image data file recorded in the PC becomes different from the original image data file present on the recording medium of the digital video camera.

Also, the isochronous transfer mode, which has a real-time property, is suitable for transferring data which include time-related information such as moving image data or audio data, but is unsuitable for transferring still image data.

In case of transferring still image data in the isochronous transfer mode, the transfer has to be executed after such still image data is converted into a format corresponding to moving image data. For this reason, the receiving side receives image data which is different from the original image data.

Also, even in case of transferring moving image data, the image data format that can be transferred in the isochronous transfer mode is limited in certain equipment, so that there is anticipated a situation where the image data to be transferred has to be converted into a transferable format before the transmission can be made.

As explained in the foregoing, in case of transmitting the image data as a continuous stream by a real-time transfer method such as the isochronous transfer mode, there results in a possibility that the transferred image data are different from the original image data. Such possibility is not limited to the case of connecting the digital video camera and the PC but may appear in all the image data exchange utilizing the real-time transfer method.

Also in case of receiving and storing the image data utilizing the real-time transfer method, the stored image data file becomes different from the original image data file. Such storage of image data file may be different from what is intended by the user, and may cause a confusion.

SUMMARY OF THE INVENTION

An object of the present invention is to solve the aforementioned drawbacks.

Another object of the present invention is to enable, by a simple operation, reception of an image data file in a format same as that of an original image data.

The above-mentioned objects can be attained, according to an aspect of the present invention, with a signal processing apparatus including:

instruction means;

a decoder for decoding an information data stream;

communication means for receiving the information data stream transmitted from a transmitting apparatus;

a storage for storing the information data stream received by the communication means, wherein the communication means has a first mode for receiving the information data while decoding the information data, and a second mode for receiving the information data while suspending the decoding of the information data; and control means for requesting the communication means to transmit an information data file including the information data stream in response to an instruction provided by the instruction means in the course of reception of the information data stream in the first mode, and controlling the communication means so as to receive in the second mode the information data file transmitted from the transmitting apparatus, in response to the transmission request.

Still other objects of the present invention, and the features thereof, will become fully apparent from the following detailed description of the embodiments, to be taken in conjunction with the accompanying drawings.

BRIEF DESCRIPTION OF THE DRAWINGS

FIG. 1 is a view showing the configuration of a data processing system in which the present invention is applied;

DESCRIPTION OF THE PREFERRED EMBODIMENTS

Figure 2:
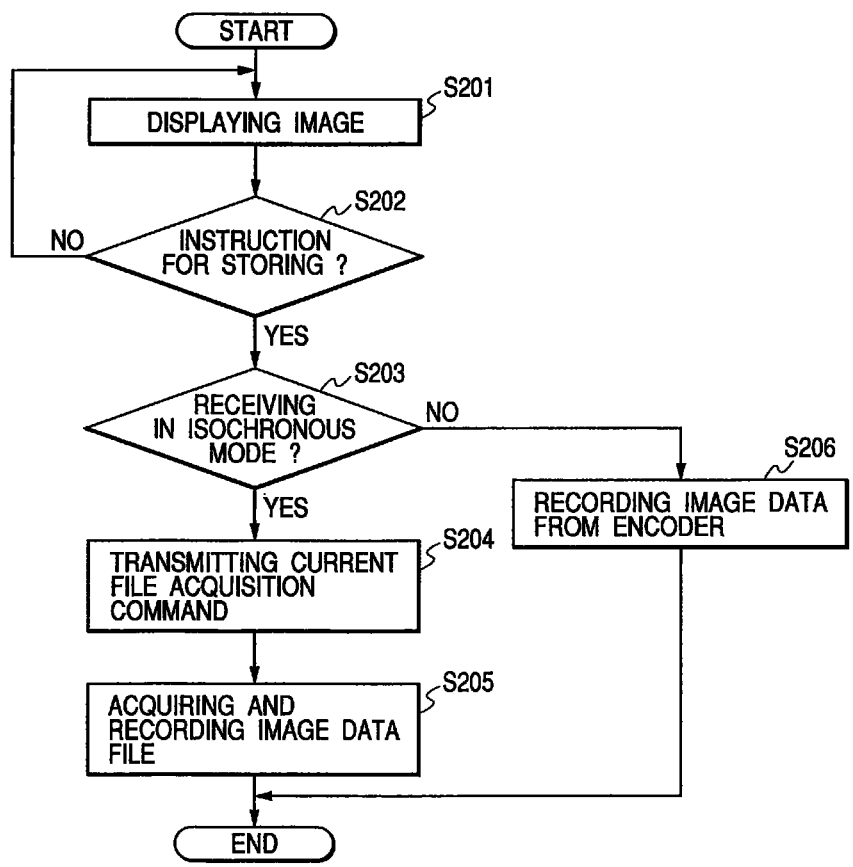
FIG. 2 is a flow chart showing a data receiving operation of an embodiment of the present invention.

FIG. 1 is a block diagram showing the configuration of a system of the present invention, constructed with a digital video camera. In an image recording-reproducing system of the present embodiment, as shown in FIG. 1, digital video cameras 100, 200 of a same configuration are connected by a digital interface. The digital video camera 100 and the digital video camera 200 have similar functions, and each has both an image transmitting function and an image receiving function provided with a digital interface.

In the following there will be explained a case where the digital video camera 100 functions as an apparatus of a receiving side while the digital video camera 200 functions as an apparatus of a transmitting side.

Also the present embodiment employs IEEE 1394 as the digital interface, and function control protocol (FCP) as a protocol for transmitting and receiving a control command. The FCP transmits various command data and response data in the asynchronous transfer mode.

The digital video camera 100 has a function of transmitting to the image transmitting apparatus, a current file acquisition command for acquiring an original image data file which is an original of image data received in the isochronous transfer mode.

Also the digital video camera 200 has a function of receiving the current file acquisition command and transmitting in the asynchronous transfer mode a file including the image data transmitted in the isochronous transfer mode.

In the digital video camera 100 shown in FIG. 1, there are provided a camera unit 101 for converting an optical image of an object into an electrical signal; an A/D converter 102; an image processing unit 103 for converting digitized image data into a digital image data of a predetermined format; and an encoder 104 for encoding the digital image data according to a predetermined encoding method to compress the information amount. In the present embodiment, the image data is encoded according to the MPEG2 method.

A disk I/F 105 executes recording and reproduction of image data in and from a disk D1. A digital interface (DIF) 106 is composed of an IEEE 1394 interface in the present embodiment, for example. A disk-shaped recording medium D1 capable of random access, such as for example a DVD-RAM or an MO, can record digital data such as moving image data, still image data or audio data, as a data file.

There are also provided a decoder 107 capable of decoding the encoded digital data; a D/A converter 108; a monitor 109 constituting display means; control means 110 for controlling the function of the video camera 100 and provided with a microcomputer; a writable memory 111 for storing program codes readable by the control means 110; an operation unit 112 composed for example of an operation panel, a remote controller etc.; and a terminal 113 for connecting the DIF 106 and an IEEE 1394 interface of an external equipment.

The video camera 200 shown in FIG. 1 has a configuration similar to that of the video camera 100, so that the detailed configuration of the video camera 200 will not be explained further.

In the following there will be given an explanation on the function of the video camera 100 and the video camera 200 shown in FIG. 1.

The video camera 100 and the video camera 200 respectively have a reproducing mode for reproducing the image data recorded in the disks D1 and D2, and a recording mode for recording as an image data file image data obtained by the camera unit or image data entered from the DIF.

The control means of each of the video camera 100 and the video camera 200 controls the function of each DIF so as to have an image transmitting function in case of the reproducing mode and an image receiving function in case of the recording mode. In the following, there will be explained, as an example, a case where the video camera 100 functions in the recording mode and the video camera 200 functions in the reproducing mode.

At first there will be explained the function of the video camera 100 in the recording mode.

The camera unit 101 converts the optical image of an object into an electrical signal and supplies the A/D converter 102 with such electrical signal. The A/D converter 102 converts the electrical signal received from the camera unit 101, into a digital signal. The image processing unit 103 converts the digitized image data into digital image data of a predetermined format and sends the converted image data to the encoder 104 and the D/A converter 108. The encoder 104 encodes the digitized image data and transfers them to the disk I/F 105.

In the recording mode, the DIF 106 can receive the image data in the isochronous transfer mode. In case of receiving the image data in the isochronous transfer mode, the DIF 106 transmits the image data to the decoder 107 and informs the control means 106 of the reception of the image data in the isochronous transfer mode. In this manner, in the isochronous transfer mode, decoding and display is executed while receiving the image data.

The DIF 106 can also transmit according to an instruction of the control means 110, a control command to another node (device) on the IEEE 1394 serial bus connected through the terminal 113. It can also received the image data file in the asynchronous transfer mode, by issuing a current file acquisition command which is one of the control commands and is used for acquiring in the asynchronous transfer mode a file of the image data currently in reception in the isochronous transfer mode. The image data file received in the asynchronous transfer mode is transferred to the disk I/F 105.

The operation unit 112 sends an operation instruction to the control means 110, according to a user operation for example for a recording of the image data from the camera unit 101 or a stopping thereof. For example, in case a recording operation is executed by the user, the operation unit 112 sends a recording instruction to the control means 110. Also in case of a stopping operation, it sends a stopping instruction to the control means 110.

According to the instruction from the operation unit 112, the control means 110 controls the recording-reproducing operation by the disk I/F 105 and gives an instruction for transmitting a control command or another instruction to the DIF 106.

In case the reception of the image data in the isochronous transfer mode is not in progress when the recording instruction is provided from the operation unit 112, the control means 110 controls the disk I/F 105 so as to record the image data from the encoder 104. Also the control means 110 sends a recording stop command to the disk I/F 105 in response to a stop instruction from the operation unit 112.

The disk I/F 105 is provided with a laser pickup, a magnetic head, and a mechanism for rotary driving the disk D1 as already known, and, upon receiving a recording instruction from the control means 110, records on the disk D1 the image data outputted from the encoder 104 when such the instruction is received. In the present embodiment, a series of moving image data recorded in the disk D1 during a period from the start of recording to the stopping of recording is recorded as a moving image file on the disk D1.

Also in case a file recording is instructed by a key manipulation on the operation unit 112 by the User in the course of reception of the image data by the DIF 106 in the isochronous transfer mode, the control means 110 instructs the DIF 106 to transmit a current file acquisition command. In response to the instruction from the control means 110, the DIF 106 generates a current file acquisition command for requesting to an external equipment the transmission in the asynchronous transfer mode of a file including the image data currently received in the isochronous transfer mode, and outputs such command to the video camera 200 which is the transmitting apparatus.

In response to such current file acquisition command, the video camera 200 of the transmitting side reproduces an image file including the image data currently transmitted to the isochronous transfer mode, from the disk D2 and transmits such image file to the DIF 106 of the video camera 100 by the asynchronous transfer mode. In the asynchronous transfer mode, the image data file is transferred at a timing irrelevant (non-synchronized) to the timing of reproduction or decoding of the image data. Also different from the image data received in the isochronous transfer mode, the image data received in the asynchronous transfer mode is not subjected to a process of decoding or display. Stated differently, the asynchronous mode is a mode of receiving the image data without executing the decoding or the display in the course of reception.

The disk I/F 105, in case of acquiring the image data file received by the DIF 106 in the asynchronous transfer mode, records such image data file in the disk D1. Also the disk I/F 105, upon receiving a stop command from the control means 110 in the source of recording of the image data from the encoder 104, terminates the recording of the image data on the disk D1.

In the recording mode, the moving image data received by the DIF 106 in the isochronous transfer mode is outputted to the decoder 107 which decodes the image data received from the DIF 106 and outputs the decoded data to the D/A converter 108.

The D/A converter 108 converts the received data into an analog signal. In case the image data is received from both the image processing unit 103 and the decoder 107, the control means 110 controls the D/A converter 108 so as to select and output the image data transferred from the decoder 107.

The monitor 109 displays an image corresponding to the analog image signal supplied from the D/A converter 108.

The above-described configuration allows the video camera 100 to record the image data being received in the isochronous transfer mode, as a file.

In the following there will be given a detailed description on the recording process of the image data in the video camera 100, with reference to a flow chart shown in FIG. 2 which illustrates a flow chart showing the process of the control means 110 in the recording mode.

Referring to FIG. 2, a step S201, in case the DIF 106 is receiving the image data in the isochronous transfer mode, decodes the received image data in the decoder 107 and displays the image data on the monitor 109, but, in case the image data are not received, displays the image data picked up by the camera unit 101 on the monitor 109.

A step S202 discriminates whether or not an image data recording is instructed by the user. In case of absence of the recording instruction, the sequence returns to the step S201 to repeat the display process of the image data. In case of presence of the recording instruction, the sequence proceeds to a step S203.

A step S203 discriminates whether or not the image data is being received in the isochronous transfer mode, and, in case the image data recording is instructed from the user in the course of reception of the image data in the isochronous transfer mode, the sequence proceeds to a step S204. A step S204 so controls the DIF 106 as to transmit a current file acquisition command in order to acquire the file of the image data currently received in the isochronous transfer mode.

Then a step S205 receives the image data file in the asynchronous transfer mode as a response to the current file acquisition command transmitted in the step S204, and records the data file in the disk D1.

When all the data of the image data file are recorded, the control means 110 displays information indicating this, on the monitor 109. In the present embodiment, even after receiving the current file acquisition command from the video camera 100, the video camera 200 continues the transmission of the image data in the isochronous transfer mode while transferring the image data file in the asynchronous transfer mode. However, the control means 210 of the video camera 200 may be so constructed as to terminate the transfer of the image data in the isochronous transfer mode in case of receiving the current file acquisition command from the video camera 100.

Also in case the image data is not being received in the isochronous transfer mode in the step S203, the sequence proceeds to a step S206 to record the image data picked up by the camera unit 101, on the disk D1. In such case, as explained in the foregoing, the image data recording on the disk D1 is terminated in response to a recording stop command.

The above-described process allows to acquire and record the image data file including the image data currently received in the isochronous transfer mode.

In the following there will be explained the function of the video camera 200 in the reproducing mode.

In the reproducing mode, the video camera 200 can reproduce the image data recorded in the disk D2, with the disk I/F 205 and transmit the image data to the video camera 100 with the DIF 206 in the isochronous transfer mode. The DIF 206 also receives a control command transmitted from another node. In case of receiving a control command, the DIF 206 transmits such control command to the control means 210.

In the disk D2, there are recorded files of digital data such as a moving image data file, a still image data file, an audio data etc.

The operation unit 212 sends an instruction for operation, such as reproduction or stopping, to the control means 210 according to an operation of the user. For example, in case a reproducing operation is executed by the user, the operation unit 212 transmits a reproducing instruction to the control means 210. Also in case a stopping operation is executed, the operation unit 212 transmits a stopping instruction to the control means 210.

The control means 210 receives an instruction from the operation unit 212 and a control command from the DIF 206, also controls the function of the disk I/F 205 and controls the data transfer process of the DIF 206.

The control means 210, upon receiving a reproducing instruction from the operation unit 212, instructs the disk I/F 205 to reproduce the image data. According to the instruction from the control means 210, the disk I/F 205 reproduces the image data recorded in the disk D2, and outputs the image data to the decoder 207 and the DIF 206. At the reproduction of the image data from the disk D2, the control means 210 retains information of a file path name for specifying the image file currently under reproduction.

The reproduced image data is decoded by the decoder 207 and is displayed on the monitor 209 through the D/A converter 208. Also the control means 210 controls the DIF 206 to transmit the reproduced image data to the video camera 100 in the isochronous transfer mode.

Also in case a current file acquisition command is transferred through the DIF 206 as explained in the foregoing, the control means 210 instructs, utilizing the memorized file path name of the currently reproduced image data, the disk I/F 205 to reproduce an image file including the currently reproduced image data.

The disk I/F 206, upon receiving a current file transmitting command from the control means 210, reads an image data file of the designated file path name from the disk D2 and outputs the read-out file to the DIF 206. The control means 210 controls the DIF 206 and transmits that image data file to the video camera 100 in the asynchronous transfer mode.

In the present embodiment, as explained in the foregoing, in case the user instructs the recording of the image data in the course of reception of the image data in the real-time transfer mode, the transfer of an original image data file including that image data is requested to the transmitting equipment. Then, in response to such the request, the transmitting equipment transmits the image file including the currently transmitted image data, in the file transfer mode.

In the present embodiment, therefore, an image data file constituting the origin of the image data currently received in the real-time transfer mode can be securely acquired. It is thus rendered possible to transfer and record an image data file in a format same as that of the original image data, and to record the image data file in a format desired by the user.

In the present embodiment, there has been explained a case of transmitting an image data file between the video cameras 100 and 200, but the present invention is applicable also to a case of transmitting plural image data file recorded in the disk D2 to the video camera 100.

In the following there will be explained a process in case plural image data files are recorded in the disk D2.

Figure 3:
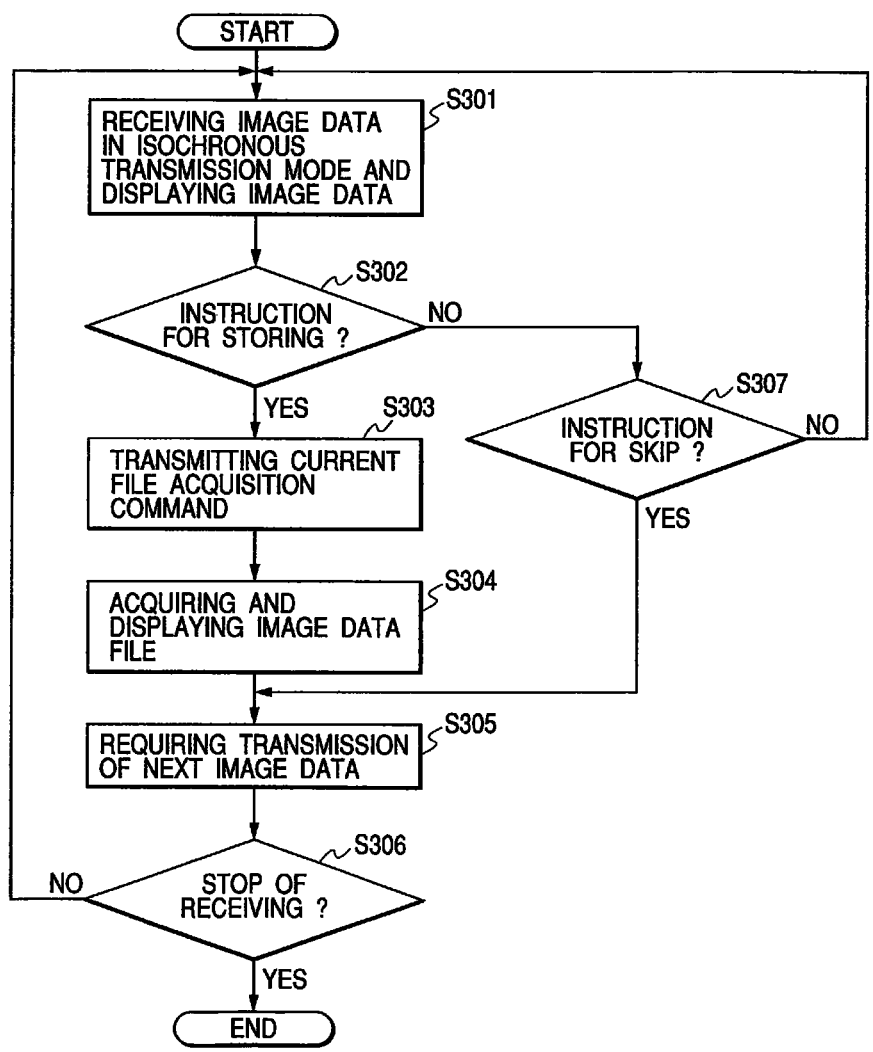
FIG. 3 is a flow chart showing a data receiving operation of an embodiment of the present invention.

FIG. 3 is a flow chart showing the function of the control means 110 in case of receiving plural image data files recorded in the disk D2, by the video camera 100.

At first, in a step S301, the video camera 200 transfers one of the image data files recorded in the disk D2, to the video camera 100 in the isochronous transfer mode, and the video camera 100 receives the image data transmitted in the isochronous transfer mode and displays the received image data on the monitor 109.

In this state, a step S302 detects whether a recording instruction by the operation unit 112 is present or absent, and, in case a recording instruction is present, a step S303 transmits a current file acquisition command from the DIF 106 to the video camera 200 as explained in the foregoing. Then, in a step S304, an image data file transmitted from the video camera 200 and including the currently received image data, is received in the asynchronous transfer mode and is recorded onto the disk D1 by the disk I/FF 105.

Then, in a step S305, the DIF 106 outputs, to the video camera 200, a command requesting the transmission of image data contained in a next image data file. Then, in case a step S306 identifies that a stopping instruction for the reception is not given by the operation unit 112, the sequence returns to the step S301 to receive image data transmitted from the video camera 200 and contained in the next image data file, in the isochronous transfer mode.

Also in case the recording instruction is absent in the step S302, a step S307 detects whether an instruction to skip from the currently received image data to a next image data file is given by the operation unit 112. In case a skipping request is present, the sequence proceeds to the step S305 to output from the DIF 106 to the video camera 200 a command for requesting transmission of image data contained in the next image data file recorded in the disk D2. In case the skipping request is absent in the step S307, the sequence returns to the step S301.

In case an instruction for stopping the reception is given from the operation unit 112 in a step S306, the process is terminated.

In the embodiment shown in FIG. 3, as explained in the foregoing, in case a recording instruction is given for the image data currently received in the isochronous transfer mode in the course of receiving the plural image data files recorded in the disk D2, by the video camera 100, a transfer request for an image data file including the currently received image data is outputted to the transmitting apparatus and then that image data file is received in the asynchronous transfer mode, whereby it is rendered possible to transfer and record the image data file in a format same as that of the original image data.

In addition, the present embodiment, after receiving and storing an image data file in the asynchronous transfer mode, automatically outputs a command requesting reproduction and transmission of a next image data file recorded in the disk D2, and is therefore very convenient in case of receiving and recording in succession plural image data files recorded in the disk D2.

Also in case the image data received and displayed in the isochronous transfer mode need not be recorded, it is only required to issue a skipping instruction whereby a request for transmission of the image data contained in the next image data file is automatically outputted and the reception in the isochronous transfer mode is initiated, and this configuration therefore is very convenient in case of receiving in succession plural image data files recorded in the disk D2.

In the video camera shown in FIG. 1, the recording and reproduction of the image data are executed on a disk medium, but the present invention is applicable to and is similarly effective in an apparatus for recording and reproducing information data such as image data on another recording medium for example a random accessible medium such as a memory card.

Also in the present embodiment, in case the DIF 106 in the video camera 100 is receiving an image data stream in the isochronous transfer mode, an image according to the image data from the DIF 106 instead of the image data from the camera unit 101 is displayed on the monitor 109 and the image file including the image data from the DIF 106 is recorded in the disk D1. However, there may also be adopted a configuration in which image data selected in advance by the user among the image data from the camera unit 101 and those from the DIF 106 are recorded in the disk D1 and displayed on the monitor 109.

In the following there will be explained a second embodiment of the present invention.

Figure 4:
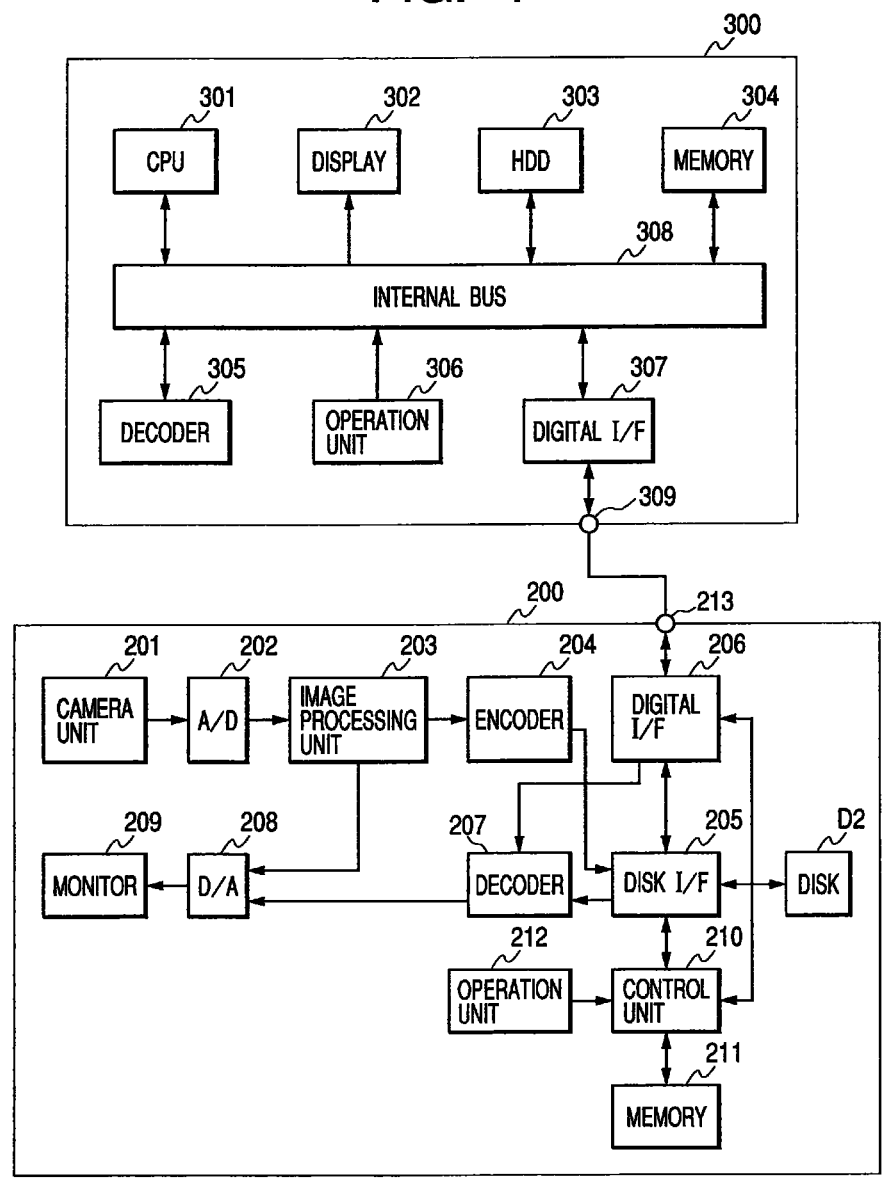
FIG. 4 is a view showing another configuration of the data processing system in which the present invention is applied.

FIG. 4 is a block diagram showing the configuration of a recording-reproducing system of the present invention, composed of a PC 300 and a video camera 200. Also in the present embodiment, the PC 300 and the video camera 200 are connected by an IEEE 1394 interface, and FCP is employed as the protocol for transmitting and receiving control commands.

The PC 300 of the present embodiment has a function of transmitting to the apparatus of the transmitting side, a path name acquisition command for acquiring a path name of an image data file received in the isochronous transfer mode and a file acquisition command for acquiring a data file.

The video camera 200 of the present embodiment has a configuration and functions explained in the foregoing embodiment, and also has a function of receiving the path name acquisition command relating to the file path name of the image data file transmitted in the isochronous transfer mode and transmitting the path name of the image data file, and a function of receiving the fine acquisition command for acquiring the image data file and transmitting the image data file in the asynchronous transfer mode.

In the PC 300 shown in FIG. 4, there are provided a processing apparatus (CPU) 301 for controlling the function of the PC 300, a display 302 such as a CRT or a liquid crystal display panel, and a hard disk (HDD) 303 for recording digital data such as program data, moving image data, still image data, audio data etc. The hard disk 303 stores an image data acquisition application to be explained later, in the form of program codes readable by the CPU 301.

There are also provided an internal memory 304, a decoder 305 for decoding encoded moving image data, still image data, audio data etc., an operation unit 306 composed of a keyboard, a mouse etc., a digital interface 307 for executing transmission and reception of digital data with an external apparatus and composed of an IEEE 1394 interface in the present embodiment for example, an internal bus 308 such as a PCI bus for connecting various processing units in the PC 300, and a terminal 309 for connecting the DIF 307 with an external equipment.

As shown in FIG. 4, the PC 300 and the video camera 200 are connected by an IEEE 1394 interface. In the following there will be explained functions and operations of the processing units constituting the PC 300. In the present embodiment, the PC 300 functions as an image receiving apparatus for receiving image data transmitted from the video camera 200.

The CPU 301 executes a software recorded in the HDD 303, and transfers various data to the internal memory 304. The CPU 301 also controls the function of the processing units connected by the internal bus 308.

The DIF 307 can receive image data transferred through the IEEE 1394 bus. The DIF 307 can also transmit a control command to another node on the IEEE 1394 serial bus.

The user selects a desired application by manipulating the operation unit 306, and causes the CPU 301 to execute the application recorded in the HDD 303. In this operation, the information relating to the application is presented by the display 302 to the user. Also the user can execute an operation on the application by manipulating the operation unit 306. For example the user can execute an image data acquiring application and thereby can instruct a storage process for the received image data.

The decoder 305 decodes the image data outputted from the DIF 307 based on the function of the application. The decoded image data is displayed on the display 302. The decoding process may also be executed by an application recorded in the HDD 303.

In the following, there will be explained, with reference to a flow chart shown in FIG. 5, the operation of the image data acquiring application in case the PC 300 receives, with the DIF 307 in the isochronous transfer mode, image data reproduced from the disk D2 in the video camera 200.

Figure 5:
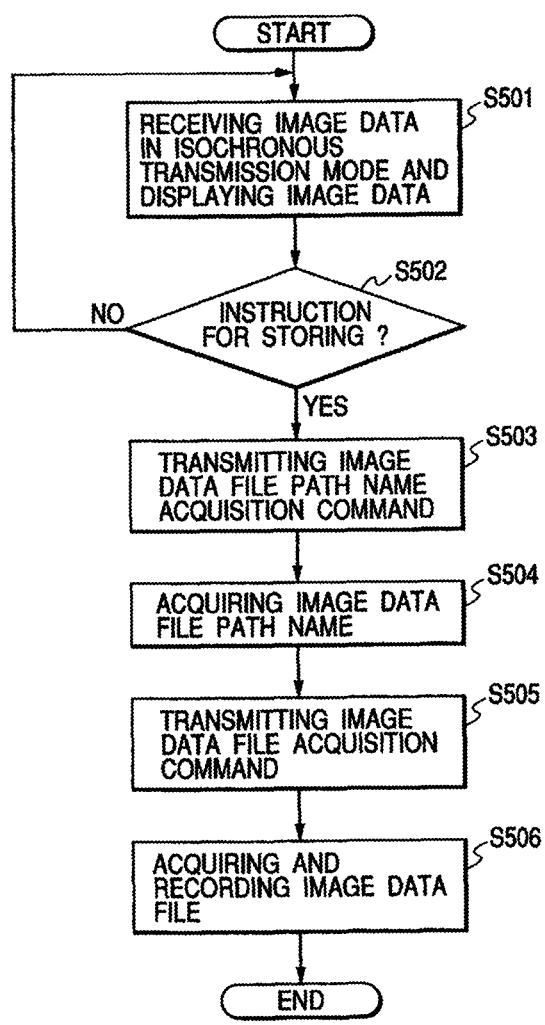
FIG. 5 is a flow chart showing a data receiving operation of an embodiment of the present invention.

FIG. 5 is a flow chart showing a control operation by the CPU 301 in the PC 300.

Referring to FIG. 5, a step S501 receives the image data transmitted in the isochronous transfer mode and causes the decoder 305 to decode the received image data and display the image data on the display 302.

Then a step S502 discriminates whether or not a storage instruction for the image data is given from the user, and, if not, the sequence returns to the step S501 to repeat the display process of the received image data.

In case a storage of the image data is instructed from the user in the course of reception of the image data in the isochronous mode, the CPU 301 controls the DIF 307 in a step S503, thereby transmitting to the video camera 200 a path name acquisition command for searching the path name of the file of the currently received image data. In response to this path name acquisition command, the video camera 200 transmits the file path name of the image data to the PC 300. In a step S504, the file path name is received by the DIF 307.

Then, in a step S505, a file acquisition command including information of the file path name acquired in the step. S504 is transmitted from the DIF 307 to the video camera 200, in order to request transmission of an image data file including the image data currently received in the isochronous transfer mode. The video camera 200 reproduces, from the disk D2, an image data file of the file path designated by file acquisition command as will be explained later, and transmits the image data file in the asynchronous transfer mode. Then, in a step S506, the DOF 307 receives the image data file thus transmitted in the asynchronous transfer mode and stores it in the HDD 303.

In the following there will be explained the function of the video camera 200.

The ordinary recording and reproducing operations are same as those in the foregoing embodiment, and, in the reproducing mode, image data is transmitted in the isochronous transfer mode from the DIF 206 to the PC 300.

When a path name acquisition command is transmitted from the PC 300 through the DIF 206, the control means 210 issues a path name acquisition instruction to the disk I/F 205. Upon receiving the path name acquisition instruction from the control means 210, the disk I/F 205, if in the course of reading the image data from the disk D2, retains information of the path name of the currently read image data file and causes the DIF 206 to transmit the information of the path name in the asynchronous transfer mode to the PC 300.

Also when a file acquisition command is sent from the PC 300 through the DIF 206, the control means 210 issues a reproducing instruction of the image data file to the disk I/F 205 and so controls the DIF 206 to terminate the file data transfer in the isochronous transfer mode. The disk I/F 205 reproduces a designated image data file from the disk D2 and so controls the DIF 206 to transmit the reproduced image data file to the computer 200 in the asynchronous transfer mode.

The present embodiment is so constructed as to terminate in advance the data transfer in the isochronous transfer mode in case of file transfer in the asynchronous transfer mode, but there may also be employed such a configuration as not to terminate the data transfer in the isochronous transfer mode.

Thus, also in the present embodiment, in case a storage instruction of the image data is given by the user in the course of reception of the image data in the real-time transfer mode by the computer, there is requested a transfer of the original image data file including such image data, to the transmitting equipment. In response to this request, the transmitting equipment transmits the image data file including the currently transmitted image data, in the file transfer mode.

In the present embodiment, therefore, an image data file constituting the origin of the image data currently received in the real-time transfer mode can be securely acquired.

In the following there will be explained a third embodiment of the present invention.

The present embodiment has a system configuration same as that shown in FIG. 4, and executes processes similar to those in the second embodiment except for an image data acquisition process in case the computer 300 is in the course of receiving the image data from the DIF 307 in the isochronous transfer mode, so that detailed description will be omitted except for this process.

In the following there will be given a detailed description, with reference to a flow chart shown in FIG. 6, on the function of an image data acquiring application in case the PC 300 is receiving the image data by the DIF 307 in the isochronous transfer mode.

Figure 6:
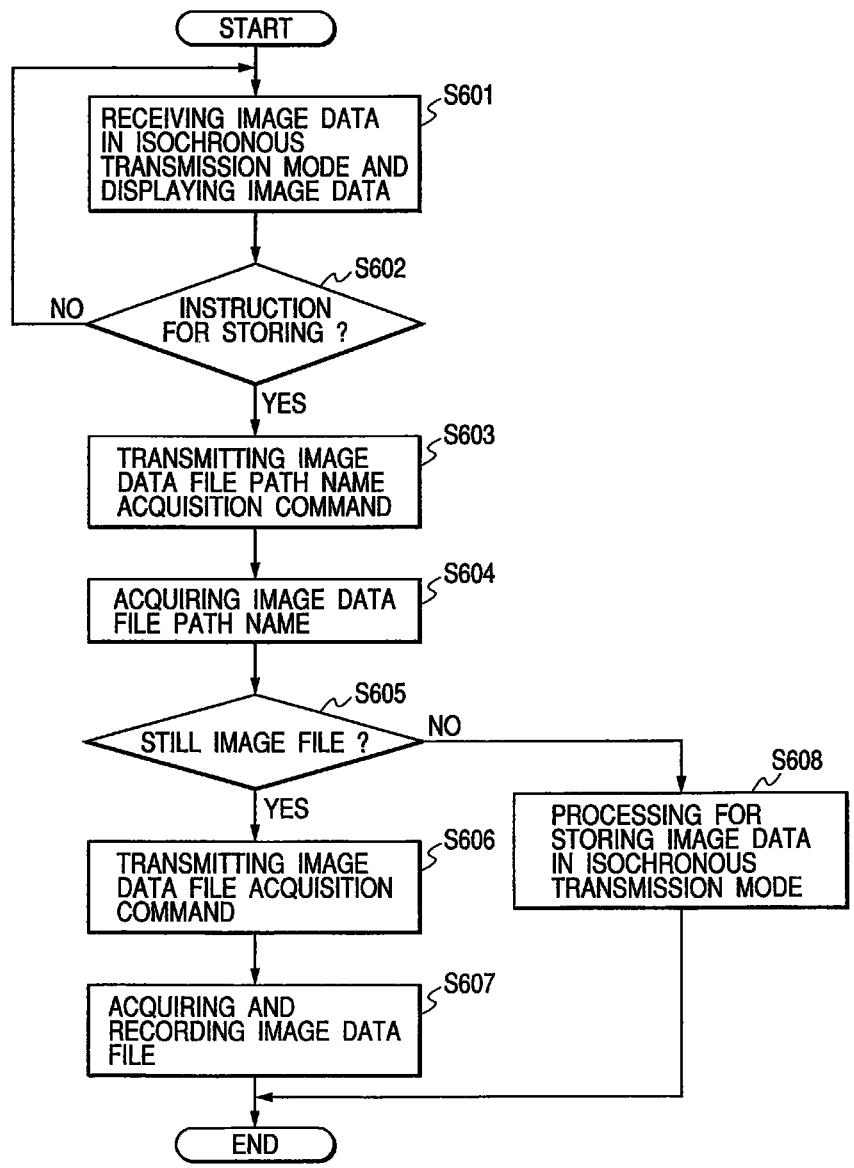
FIG. 6 is a flow chart showing a data receiving operation of an embodiment of the present invention.

FIG. 6 is a flow chart showing the control function of the CPU 301 in an image data receiving process.

Referring to FIG. 6, steps S601 to S604 are similar to the steps S501 to S504 in FIG. 5.

Then a step S605 detects the form of the image data file including the image data on the basis of a file extension contained in the file path name acquired in the step S604, and judges the receiving method. More specifically, in case the file extension is an extension indicating a still image (for example jpg or jpeg), the sequence proceeds to a step S606, but, in case of any other extension, the sequence proceeds to a step S608.

In the present embodiment, the JPEG extension is referred to as an example of the file extension for identifying a still image, but another extension may be used for such judgment. Also in the present embodiment, the format of the image is judged with the extension of the file, but there may also be employed another method for such the judgment.

In case the step S605 identifies that the image data received in the isochronous transfer mode is data of a still image file, a file acquisition command including the information on the file path name acquired in the step S604 is transmitted from the DIF 307 to the video camera 200, in order to request a transmission of the image data file including the image data currently received in the isochronous transfer mode. The video camera 200 reproduces, from the disk D2, an image data file of the file path designated by the file acquisition command, and transmits the image data file in the asynchronous transfer mode. Then, in a step S607, the image data file transmitted in the asynchronous transfer mode is received by the DIF 307 and is stored in the HDD 303.

In case the image data file including the image data received in the isochronous transfer mode is not a still image file, a step S608 stores the image data received in the isochronous transfer mode.

In the present embodiment, as explained in the foregoing, while receiving the image data in the real-time transfer mode, the image data is acquired still in this real-time transfer mode in case the image data file including that image data is a moving image data file, but the image data file is acquired in the file transfer mode in case the image data file is a still image data file.

Therefore the user is not required to distinguish whether the file format of the image data received in the real-time transfer mode is a moving image data format or a still image data format, and the user can acquire the desired image data with a similar operation in either format.

In the foregoing third embodiment, in case the format of the image data transmitted in the real-time transfer mode is a still image file, the still image file is received in the asynchronous transfer mode, but there may be also adopted a configuration which, in case the format of the image data contained in the original image file is converted and transmitted in the isochronous transfer mode, compares the format of the currently received image data with the format of the original image data file and, if these formats are mutually different, requests a transmission of the original image data file in the asynchronous transfer mode.

In the foregoing embodiments, there has been explained a system which transmits and receives the image data utilizing the IEEE 1394 interface, but the present invention is likewise applicable to a system executing transmission and reception of information data with a communication interface which is provided with a mode of executing decoding and monitoring of the information data on real-time basis in the course of transmission/reception of the information data, and a mode of executing decoding and monitoring of the information data at a timing not in the course of reception of the information data.

Also in the foregoing embodiments, there has been explained a transmission/reception process of image data, but the present invention is likewise applicable to a case of transmitting and/or receiving other information data, such as audio data.

Furthermore, the functions explained in the foregoing embodiments may also be realized by a computer, and, in such case, a memory medium storing an operation program therefor is included also in the present invention.

The embodiments of the present invention explained in the foregoing allow to securely obtain an image data file which constitutes an origin of image data currently received in the real-time transfer mode. It is thus rendered possible to transfer and record the image data file in a format same as that of the original image data, and the image data file can be stored in a format desired by the user.

Many widely different embodiments of the present invention may be constructed without departing from the spirit and scope of the present invention. It should be understood that the present invention is not limited to the specific embodiments described in the specification, except as defined in the appended claims.

What is claimed is:

1. A camera comprising:
    a communication unit configured to communicate with an external transmission apparatus and to receive moving image data, which is read out from a recording medium and is transmitted by the external transmission apparatus, wherein a moving image file which stores the moving image data is recorded on the recording medium;
    an instruction receiving unit configured to receive an acquiring instruction for acquiring the moving image file storing the moving image data, while the communication unit is receiving the moving image data transmitted by the external transmission apparatus;
    a controller configured to control the communication unit, in accordance with the acquiring instruction received by the instruction receiving unit during receiving of the moving image data by the communication unit, so as to request the external transmission apparatus to start transmitting the moving image file storing the moving image data which the communication unit is receiving, wherein the communication unit receives the moving image file, which the external transmission apparatus reads out from the recording medium and starts to transmit in accordance with the transmission start request, the moving image file storing the moving image data which includes the moving image data which has been received by the communication unit before the instruction receiving unit receives the acquiring instruction; and
    a storage unit configured to store the moving image file received by the communication unit in a storage medium.

2. A camera according to claim 1, wherein the controller controls, in accordance with the acquiring instruction received by the instruction receiving unit, the communication unit so as to transmit, to the external transmission apparatus, a file acquisition command for requesting a start of transmission of the moving image file.

3. A camera according to claim 2, wherein the communication unit receives from the external transmission apparatus information of a file path name of the moving image file corresponding to the moving image data which the communication unit is receiving, and the file acquisition command includes information of the file path name of the moving image file which the start of transmission is requested.

4. A camera according to claim 1, wherein the communication unit has an isochronous transmission mode and an asynchronous transmission mode, and
    wherein the controller controls the communication unit, in accordance with the acquiring instruction received during receiving of the moving image data in the isochronous transmission mode, to request the external transmission apparatus to start transmitting the moving image file by the asynchronous transmission mode.

5. A camera according to claim 1, further comprising:
    a display unit configured to display an image indicated by the moving image data on a display device, the controller controlling the display unit to display the image indicated by the moving image data which the communication unit is receiving and controlling to store the moving image file by the storage unit without displaying moving image data included in the moving image file received by the communication unit.

6. A camera according to claim 1, wherein the communication unit receives the moving image file while receiving the moving image data.

7. A camera according to claim 1, wherein the communication unit stops receiving the moving image data in accordance with reception of the moving image file.

8. A camera according to claim 1, wherein the external transmission apparatus is connected with the communication unit via a cable.

9. A camera comprising:
    a communication unit configured to communicate with an external transmission apparatus and to receive moving image data, which is stored in a moving image file recorded on a recording medium and is read out from the recording medium, transmitted by the external transmission apparatus;
    an instruction receiving unit configured to receive an acquiring instruction for acquiring the moving image file storing the moving image data while the communication unit is receiving the moving image data transmitted by the external transmission apparatus;
    a controller configured to control the communication unit, in accordance with the acquiring instruction received by the instruction receiving unit during receiving of the moving image data by the communication unit, so as to request the external transmission apparatus to start transmitting the moving image file storing the moving image data which the communication unit is receiving, wherein the communication unit receives the moving image file, which the external transmission apparatus reads out from the recording medium and starts to transmit in accordance with the transmission start request;
    a storage unit configured to store the moving image file received by the communication unit in a storage medium; and
    a decoder configured to decode the moving image data,
    wherein the controller controls such that (a) the decoder decodes the moving image data which the communication unit is receiving and (b) the storage unit stores the moving image file received by the communication unit without decoding by the decoder of the moving image data stored in the moving image file.

10. A method for controlling a camera comprising (a) a communication unit configured to communicate with an external transmission apparatus and to receive moving image data, which is read out from a recording medium and is transmitted by the external transmission apparatus, and (b) a storage unit configured to store data in a storage medium, wherein a moving image file which stores the moving image data is recorded on the recording medium, the method including:
    receiving an acquiring instruction for acquiring the moving image file storing the moving image data while the communication unit is receiving the moving image data transmitted by the external transmission apparatus;
    controlling the communication unit, in accordance with the acquiring instruction received in the receiving step during receiving of the moving image data by the communication unit, so as to request the external transmission apparatus to start transmitting the moving image file storing the moving image data which the communication unit is receiving;

receiving the moving image file, which the external transmission apparatus reads out from the recording medium and starts to transmit in accordance with the transmission start request, the moving image file storing the moving image data which includes the moving image data which has been received by the communication unit before the acquiring instruction is received; and controlling the storage unit to store the received moving image file in the storage medium.

11. A method according to claim 10, wherein the controlling step controls, in accordance with the acquiring instruction, the communication unit so as to transmit, to the external transmission apparatus, a file acquisition command for requesting a transmission of the moving image file.

12. A method according to claim 11, wherein the communication unit receives from the external transmission apparatus information of a file path name of the moving image file corresponding to the moving image data which the communication unit is receiving, and the file acquisition command includes information of the file path name of the moving image file, the start of transmission of which is requested.

13. A method according to claim 10, wherein the controlling step controls the communication unit to receive the moving image file while receiving the moving image data.

14. A method according to claim 10, wherein the controlling step controls the communication unit to stop receiving the moving image data in accordance with reception of the moving image file.

15. A method according to claim 10, wherein the external transmission apparatus includes a video camera.

16. A non-transitory computer-readable memory storing a program comprising a program code for causing a computer to execute a method for controlling a camera comprising (a) a communication unit configured to communicate with an external transmission apparatus and to receive moving image data, which is read out from a recording medium and is transmitted by the external transmission apparatus, and (b) a storage unit configured to store data in a storage medium, wherein a moving image file which stores the moving image data is recorded on the recording medium, the method including:

receiving an acquiring instruction for acquiring the moving image file storing the moving image data while the communication unit is receiving the moving image data transmitted by the external transmission apparatus;

controlling the communication unit, in accordance with the acquiring instruction received in the receiving step during receiving of the moving image data by the communication unit, so as to request the external transmission apparatus to start transmitting the moving image file storing the moving image data which the communication unit is receiving;

receiving the moving image file, which the external transmission apparatus reads out from the recording medium and starts to transmit in accordance with the transmission start request, the moving image file storing the moving image data which includes the moving image data which has been received by the communication unit before the acquiring instruction is received; and controlling the storage unit to store the received moving image file in the storage medium.

17. A camera comprising:

a communication unit configured to communicate with an external transmission apparatus and to receive moving image data transmitted from the external transmission apparatus, wherein an original image file of the moving image data transmitted by the external transmission apparatus is recorded on a recording medium and the moving image data is read out from the recording medium and is transmitted;

an instruction receiving unit configured to receive an acquiring instruction for acquiring the original image file of the moving image data while the communication unit is receiving the moving image data transmitted by the external transmission apparatus;

a controller configured to control the communication unit, in accordance with the acquiring instruction received by the instruction receiving unit during receiving of the moving image data by the communication unit, so as to request the external transmission apparatus to start transmitting the original image file of the moving image data which the communication unit is receiving, wherein the communication unit receives the original image file, which the external transmission apparatus reads out from the recording medium and starts to transmit in accordance with the transmission start request, the original image file storing the moving image data having been received by the communication unit before the instruction receiving unit receives the acquiring instruction; and a storage unit configured to store the original image file received by the communication unit in a storage medium.

18. A camera according to claim 17, wherein the controller controls, in accordance with the acquiring instruction received by the instruction receiving unit, the communication unit so as to transmit, to the external transmission apparatus, a file acquisition command for requesting a start of transmission of the original image file.

19. A camera according to claim 17, wherein the communication unit receives information of a file path name of the original image file corresponding to the moving image data which the communication unit is receiving, and the file acquisition command includes information of a file path name of the original image file whose transmission is requested.

20. A camera according to claim 17, wherein the communication unit receives the original image file while receiving the moving image data.

21. A camera according to claim 17, wherein the communication unit stops receiving the moving image data in accordance with reception of the original image file.

22. A camera according to claim 17, wherein the communication unit has an isochronous transmission mode and an asynchronous transmission mode, and wherein the controller controls the communication unit, in accordance with the acquiring instruction during receiving of the moving image data in the isochronous transmission mode, to request the external transmission apparatus to start transmitting the moving image file by the asynchronous transmission mode.

23. A camera according to claim 17, wherein the external transmission apparatus is connected with the communication unit via a cable.

24. A method for controlling a camera comprising a communication unit configured to communicate with an external transmission apparatus and to receive moving image data transmitted by the external transmission apparatus, wherein an original image file of the moving image data transmitted by the external transmission apparatus is recorded on a recording medium and the moving image data is read out from the recording medium and is transmitted, and a storage unit configured to store in a storage medium, the method including:

receiving an acquiring instruction for acquiring the original image file of the moving image data while the communication unit is receiving the moving image data transmitted by the external transmission apparatus;

controlling the communication unit, in accordance with the acquiring instruction received by the receiving step during receiving of the moving image data by the communication unit, so as to request the external transmission apparatus to start transmitting the original image file of the moving image data which the communication unit is receiving;

receiving the original image file, which the external transmission apparatus reads out from the recording medium and starts to transmit in accordance with the transmission start request, the original image file storing the moving image data having been received by the communication unit before receiving the acquiring instruction; and controlling the storage unit to store the received original image file in the storage medium.

25. A method according to claim 24, wherein the controlling step controls, in accordance with the acquiring instruction, the communication unit so as to transmit, to the external transmission apparatus, a file acquisition command for requesting a start of transmission of the original image file.

26. A method according to claim 24, wherein the communication unit receives information of a file path name of the original image file corresponding to the moving image data which the communication unit is receiving, and the file acquisition command includes information of a file path name of the original image file which the start of transmission is requested.

27. A method according to claim 24, wherein the controlling step controls the communication unit to receive the original image file while receiving the moving image data.

28. A method according to claim 24, wherein the controlling step controls the communication unit to stop receiving the moving image data in accordance with reception of the original image file.

29. A method according to claim 24, wherein the external transmission apparatus includes a camera.

30. A non-transitory computer-readable memory storing a program comprising a program code for causing a computer to execute a method for controlling a camera comprising a communication unit configured to communicate with an external transmission apparatus and a storage unit configured to store in a storage medium, wherein an original image file of the moving image data transmitted by the external transmission apparatus is recorded on a recording medium and the moving image data is read out from the recording medium and is transmitted, the method including:

receiving an acquiring instruction for acquiring the original image file of the moving image data while the communication unit is receiving the moving image data transmitted by the external transmission apparatus;

controlling the communication unit, in accordance with the acquiring instruction received by the receiving step during receiving of the moving image data by the communication unit, so as to request the external transmission apparatus to start transmitting the original image file of moving image data which the communication unit is receiving;

receiving the original image file, which the external transmission apparatus reads out from the recording medium and starts to transmit in accordance with the transmission start request, the original image file storing the moving image data having been received by the communication unit before receiving the acquiring instruction; and controlling the storage unit to store the received original image file in the storage medium.

31. An image processing apparatus comprising:

a communication unit configured to communicate with an external transmission apparatus and to receive moving image data, which is read out from a recording medium and is transmitted by the external transmission apparatus, wherein a moving image file which stores the moving image data is recorded on the recording medium;

an instruction receiving unit configured to receive an acquiring instruction for acquiring the moving image file storing the moving image data, while the communication unit is receiving the moving image data transmitted by the external transmission apparatus;

a controller configured to control the communication unit, in accordance with the acquiring instruction received by the instruction receiving unit during receiving of the moving image data by the communication unit, so as to request the external transmission apparatus to transmit the moving image file storing the moving image data which the communication unit is receiving, wherein the communication unit (a) outputs to the external transmission apparatus information relating to a file name of the moving image file storing the moving image data which the communication unit is receiving and (b) receives the moving image file, which the external transmission apparatus reads out from the recording medium and starts to transmit in accordance with the transmission request, wherein the moving image file stores moving image data which includes the moving image data which has been received by the communication unit before the instruction receiving unit receives the acquiring instruction; and a storage unit configured to store, in a storage medium, the moving image file received by the communication unit.

32. An apparatus according to claim 31, wherein the moving image data continues to be transmitted from the external transmission apparatus after the communication unit requests the external transmission apparatus to transmit the moving image file storing the moving image data which the communication unit is receiving, and wherein the communication unit continues receiving the moving image data after the request of transmitting the moving image file storing the moving image data which the communication unit is receiving.

33. An apparatus according to claim 31, wherein the communication unit outputs to the external transmission apparatus a file acquisition command including a file path name of the moving image file for which the transmission is requested.

34. An apparatus according to claim 31, wherein the communication unit receives the moving image file while receiving the moving image data.

35. An image processing method comprising:

communicating with an external transmission apparatus to receive moving image data, which is read out from a recording medium and is transmitted by an external transmission apparatus, wherein a moving image file which stores the moving image data is recorded on the recording medium;

receiving an acquiring instruction for acquiring the moving image file storing the moving image data, while receiving the moving image data transmitted by the external transmission apparatus;

requesting the external transmission apparatus to transmit the moving image file storing the moving image data which is being received in the communicating, in accordance with the acquiring instruction received during receiving of the moving image data in the communicating, wherein the communicating (a) outputs to the external transmission apparatus information relating to a file name of the moving image file storing the moving image data which is being received in the communicating and (b) receives the moving image file, which the external transmission apparatus reads out from the recording medium and starts to transmit in accordance with the transmission request, wherein the moving image file stores moving image data which includes the moving image data which has been received in the communicating before the acquiring instruction is received; and storing the received moving image file in a storage medium.

* * * * *